(12) United States Patent
Mori

(10) Patent No.: US 6,470,379 B1
(45) Date of Patent: Oct. 22, 2002

(54) METHOD AND APPARATUS FOR FACSIMILE CAPABLE OF COMMUNICATING WITH DATA PROCESSING AND FACSIMILE MACHINES

(75) Inventor: Yukikazu Mori, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/294,681

(22) Filed: Apr. 19, 1999

(30) Foreign Application Priority Data

Apr. 20, 1998 (JP) .......................................... 10-123939

(51) Int. Cl.⁷ .............................................. G06F 15/16
(52) U.S. Cl. ........................ 709/206; 709/246; 358/402
(58) Field of Search ................................. 709/233, 206, 709/238, 224, 246; 358/1.15, 407, 402; 379/100.08, 100.14

(56) References Cited

U.S. PATENT DOCUMENTS

| 5,146,349 A | | 9/1992 | Mori | |
| 5,402,250 A | | 3/1995 | Ishida et al. | |
| 5,881,233 A | * | 3/1999 | Toyoda et al. | ............... 709/233 |
| 6,052,445 A | * | 4/2000 | Bashoura et al. | ...... 379/100.14 |
| 6,101,244 A | * | 8/2000 | Okada | .................... 379/100.08 |
| 6,157,706 A | * | 12/2000 | Rachelson | ............. 379/100.08 |
| 6,185,603 B1 | * | 2/2001 | Henderson et al. | ......... 709/206 |
| 6,219,150 B1 | * | 4/2001 | Eguchi | ....................... 358/1.15 |
| 6,266,160 B1 | * | 7/2001 | Saito et al. | ................. 358/407 |

* cited by examiner

*Primary Examiner*—Ayaz Sheikh
*Assistant Examiner*—Oanh Duong
(74) *Attorney, Agent, or Firm*—Cooper & Dunham LLP

(57) ABSTRACT

An Internet facsimile apparatus is provided for eliminating inconveniences possibly experienced by the user when receiving a plurality of electronic mail from the same Internet facsimile apparatus. Since the contents of transmitter unique information is placed in a From field or a Subject field of an electronic mail received from an originating Internet facsimile apparatus, the user can estimate the contents of the electronic mail by referring to the contents of a list of electronic mail information to readily find a desired electronic mail.

25 Claims, 12 Drawing Sheets

FIG. 1 PRIOR ART

| ITEM NUMBER | SUBJECT NAME | DATE AND TIME | SOURCE |
|---|---|---|---|
| 1 | FAX MESSAGE FROM INTERNET FAX | 01/05 12:12 | Inet-fax@abcd.co.jp |
| 2 | FAX MESSAGE FROM INTERNET FAX | 01/05 12:15 | Inet-fax@abcd.co.jp |
| 3 | FAX MESSAGE FROM INTERNET FAX | 01/05 13:00 | Inet-fax@abcd.co.jp |
| 4 | FAX MESSAGE FROM INTERNET FAX | 01/05 13:20 | Inet-fax@abcd.co.jp |
| 5 | FAX MESSAGE FROM INTERNET FAX | 01/05 14:40 | Inet-fax@abcd.co.jp |
| 6 | FAX MESSAGE FROM INTERNET FAX | 01/05 15:19 | Inet-fax@abcd.co.jp |
| 7 | FAX MESSAGE FROM INTERNET FAX | 01/05 15:22 | Inet-fax@abcd.co.jp |
| 8 | FAX MESSAGE FROM INTERNET FAX | 01/05 15:38 | Inet-fax@abcd.co.jp |

| ITEM NUMBER | REGISTERED NUMBER | REGISTERED NAME |
|---|---|---|
| 1 | 0123-4567-8901 | AAA BRANCH |
| 2 | user1@abcd.co.jp | ORIGINATING USER NAME 1 |
| 3 | user2@abcd.co.jp | ORIGINATING USER NAME 2 |
| 4 | user-a@xyz.co.jp | DESTINATION USER NAME 1 |
| ... | ... | ... |

FIG. 8A

Message-ID: <33833388.4CC6E3C4@abcd.co.jp>
Date: Thu, 05 Jan 1998 12:00:00 +0900
From: <inet-fax@abcd.co.jp>
To: user-a@xyz.co.jp
Subject: FAX Message from Internet FAX

FIG. 8B

Message-ID: <33833388.4CC6E3C4@abcd.co.jp>
Date: Thu, 05 Jan 1998 12:00:00 +0900
From: <user1@abcd.co.jp>
To: user-a@xyz.co.jp
Subject: FAX Message from Internet FAX

FIG. 8C

Message-ID: <33833388.4CC6E3C4@abcd.co.jp>
Date: Thu, 05 Jan 1998 12:00:00 +0900
From: <inet-fax@abcd.co.jp>
To: user-a@xyz.co.jp
Subject: FAX Message from
[ORIGINATING USER NAME 1]

FIG. 8D

Message-ID: <33833388.4CC6E3C4@abcd.co.jp>
Date: Thu, 05 Jan 1998 12:00:00 +0900
From: <inet-fax@abcd.co.jp>
To: user-a@xyz.co.jp
Subject: <URGENT> FAX Message from Internet FAX

FIG. 9

| ITEM NUMBER | SUBJECT NAME | DATE AND TIME | SOURCE |
|---|---|---|---|
| 1 | FAX MESSAGE FROM INTERNET FAX | 01/05 12:12 | Inet-fax@abcd.co.jp |
| 2 | FAX MESSAGE FROM [ORIGINATING USER NAME 1] | 01/05 12:15 | Inet-fax@abcd.co.jp |
| 3 | FAX MESSAGE FROM INTERNET FAX | 01/05 13:00 | user1@abcd.co.jp |
| 4 | FAX MESSAGE FROM INTERNET FAX | 01/05 13:20 | user2@abcd.co.jp |
| 5 | FAX MESSAGE FROM [ORIGINATING USER NAME 2] | 01/05 14:40 | Inet-fax@abcd.co.jp |
| 6 | FAX MESSAGE FROM INTERNET FAX | 01/05 15:19 | Inet-fax@abcd.co.jp |
| 7 | FAX MESSAGE FROM INTERNET FAX | 01/05 15:22 | user3@abcd.co.jp |
| 8 | FAX MESSAGE FROM INTERNET FAX | 01/05 15:38 | user4@abcd.co.jp |

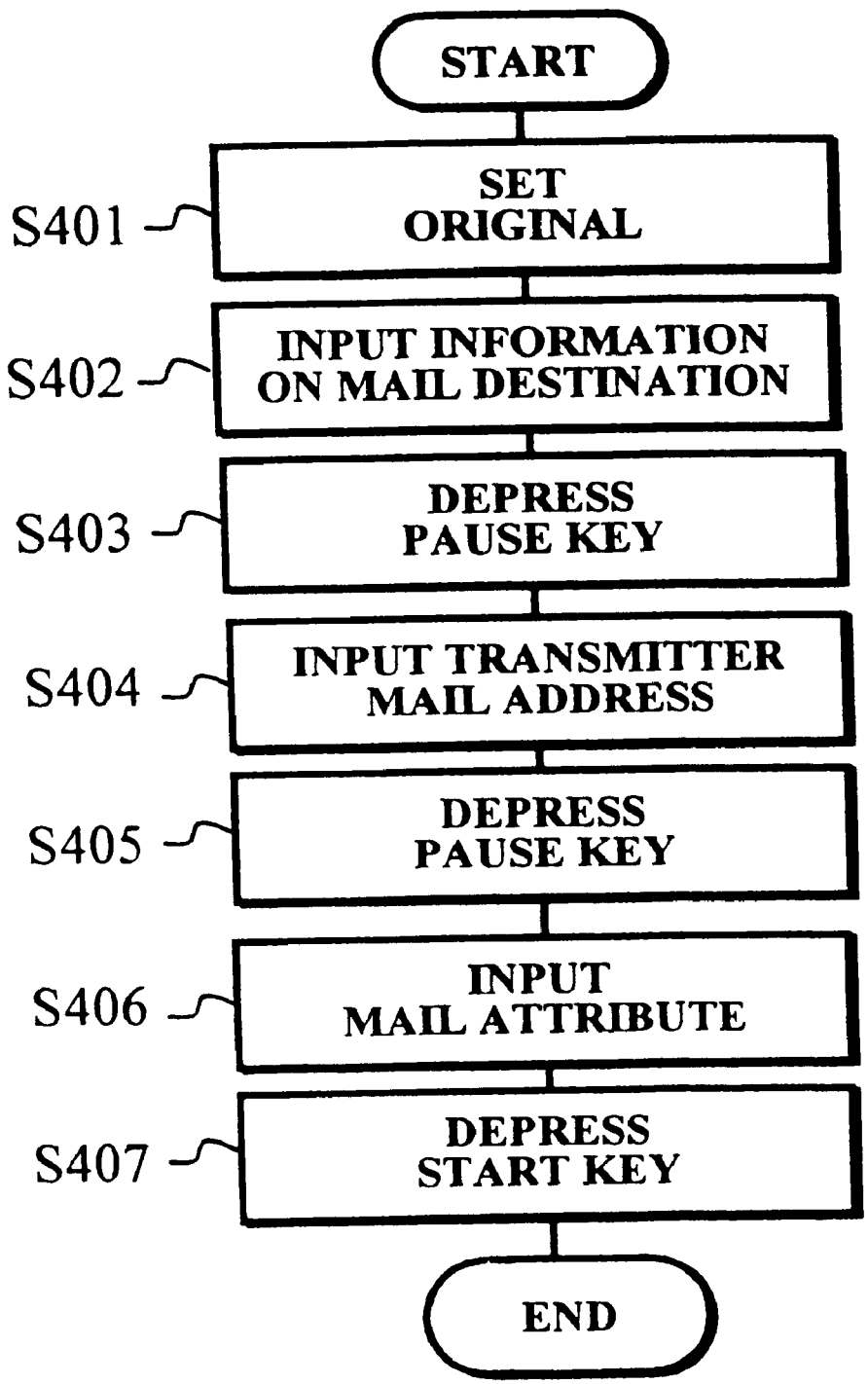

FIG. 12

| ITEM NUMBER | SUBJECT NAME | DATE AND TIME | SOURCE |
|---|---|---|---|
| 1 | FAX MESSAGE FROM INTERNET FAX | 01/05 12:12 | Inet-fax@abcd.co.jp |
| 2 | FAX MESSAGE FROM [ORIGINATING USER NAME 1] | 01/05 12:15 | Inet-fax@abcd.co.jp |
| 3 | FAX MESSAGE FROM INTERNET FAX | 01/05 13:00 | user1@abcd.co.jp |
| 4 | FAX MESSAGE FROM INTERNET FAX | 01/05 13:20 | user2@abcd.co.jp |
| 5 | FAX MESSAGE FROM [ORIGINATING USER NAME 2] | 01/05 14:40 | Inet-fax@abcd.co.jp |
| 6 | <URGENT> FAX MESSAGE FROM INTERNET FAX | 01/05 15:19 | Inet-fax@abcd.co.jp |
| 7 | <IMPORTANT> FAX MESSAGE FROM INTERNET FAX | 01/05 15:22 | user3@abcd.co.jp |
| 8 | <URGENT> FAX MESSAGE FROM INTERNET FAX | 01/05 15:38 | user4@abcd.co.jp |

FIG. 13

| ITEM NUMBER | REGISTERED NUMBER | REGISTERED NAME | ORIGINATING MAIL ADDRESS | ORIGINATING USER NAME |
|---|---|---|---|---|
| 1 | 0123-4567-8901 | AAA BRANCH | | |
| 2 | user-a@xyz.co.jp | DESTINATION USER NAME 1 | user1@abcd.co.jp | ORIGINATING USER NAME 1 |
| 3 | user-a@xyz.co.jp | DESTINATION USER NAME 1 | user1@abcd.co.jp | ORIGINATING USER NAME 2 |
| ... | ... | ... | ... | ... |

METHOD AND APPARATUS FOR FACSIMILE CAPABLE OF COMMUNICATING WITH DATA PROCESSING AND FACSIMILE MACHINES

BACKGROUND OF THE INVENTION

1. Field of the Invention

The present invention relates to a method and apparatus for facsimile, and more particularly to a method and apparatus for facsimile which is capable of performing communications with data processing machines such as personal computers as well as communications with facsimile machines.

2. Description of Related Art

Conventionally, a so-called Internet facsimile apparatus, which is connected to a local area network linked to an Internet service provider through a dedicated line or through a dial-up function, has been used to provide at least a function of communicating an electronic mail on a local area network and on the Internet. The apparatus has also been used to perform a function of transmitting image information using an ordinary public line in accordance with a predetermined facsimile transmission procedure.

The use of such an Internet facsimile apparatus enables, for example, transmission of image information between a workstation (a personal computer or the like) connected to a local area network and a facsimile apparatus connected to an ordinary public line external to the workstation utilizing a relay function of the Internet facsimile, thus providing a very convenient service.

Also, when the Internet facsimile apparatus is connected to an Internet service provider through a dedicated line, the use of the relay function provided by the Internet facsimile apparatus is highly advantageous in that communication expenses can be largely reduced for image information communications between facsimile apparatuses located at remote sites from each other, because no extra rate is added for communication between the Internet facsimile apparatuses.

Generally, when an Internet facsimile apparatus is to communicate image information with a workstation connected to a local area network, or communicate image information with another Internet facsimile apparatus through the Internet, an electronic mail is used as its communication application.

The electronic mail utilizing the Internet, on the other hand, is subject to a data format, protocol and so on defined therefor. For example, each electronic mail should contain header information which includes a variety of significant information such as the mail address of an originating user ("From" field), subject information indicative of the contents of the main text of information ("Subject" field) and so on as well as the mail address of a destination user ("To" field).

With a conventional Internet facsimile apparatus, however, information inherent to the Internet facsimile apparatus is added to the "From" field and the "Subject" field in the header information of the electronic mail irrespective of the user who uses the Internet facsimile apparatus. Therefore, if a plurality of image information transmissions are delivered from the same Internet facsimile apparatus to a user, the user will receive a plurality of electronic mails which are only different in received date and time (or transmitted date and time) but have the same transmitter name and the same subject name.

Specifically, when the user of a workstation displays a list of received electronic mails, the contents as shown in FIG. 1, for example, are displayed on the screen of the workstation.

Thus, the user who has received a plurality of electronic mails from the same Internet facsimile apparatus cannot know the contents of the respective electronic mails from a list of electronic mails as shown in FIG. 1. If the user desires certain image information, the user must display the contents of all the electronic mails for finding the desired image information, thus experiencing an inconvenience.

SUMMARY OF THE INVENTION

In one aspect, the present invention provides a data processing apparatus which is operatively connected to a local area network, Internet, and a public telephone network, wherein the data processing apparatus is provided with at least functions of transmitting and receiving electronic mail on the local area network and the Internet and transmitting and receiving image information in accordance with a predetermined facsimile transmission procedure through the public telephone network. The data processing apparatus includes a transmitter unique information input mechanism that inputs transmitter unique information unique to a transmitter and a transmission controller which is operative when specified destination information is a mail address upon transmitting image information to transmit the image information using electronic mail. Further, the data processing apparatus includes an information controller which is operative when the contents of transmitter unique information input through the transmitter unique information input mechanism is a mail address to place the contents of the input transmitter unique information in a first specific field of the electronic mail, and operative when the contents of the transmitter unique information input through the transmitter unique information input mechanism is other than a mail address to place the contents of the transmitter unique information in a second specific field of the electronic mail.

The data processing apparatus may further include a mail attribute information input mechanism that inputs an attribute of a mail to be transmitted. If the data processing apparatus has a mail attribute information input mechanism, the information controller of the data processing apparatus may be operative when an attribute of a mail to be transmitted is input through the mail attribute information input mechanism to add the contents of the input attribute to the second specific field of the electronic mail.

Preferably, the predetermined facsimile transmission procedure is a Group 3 facsimile communications procedure.

Also, the first and second specific fields of the electronic mail are preferably From and Subject fields, respectively.

In another aspect, the present invention provides a data processing apparatus, operatively connected to a local area network, Internet, and a public telephone network, wherein the data processing apparatus is provided with at least functions of transmitting and receiving electronic mail on the local area network and the Internet and transmitting and receiving image information in accordance with a predetermined facsimile transmission procedure through the public telephone network. The data processing apparatus includes a dial shortening mechanism that specifies destination information with less key manipulations, wherein the dial shortening mechanism is additionally registered with transmitter unique information unique to a transmitter associated with the destination information when destination information is a mail address. The data processing apparatus further includes a transmission controller which is operative when destination information specified by the dial shortening mechanism is a mail address upon transmitting image information to transmit the image information using electronic mail. Further, the data processing apparatus includes an information controller which reads transmitter unique information associated with the destination information registered in the dial shortening means. Further, the information controller is operative when the contents of the read transmitter unique information is a mail address to place the contents of the read transmitter unique information in a first specific field of the electronic mail, and operative when the contents of the read transmitter unique information is other than a mail address to place the contents of the read transmitter unique information in a second specific field of the electronic mail.

The data processing apparatus may further include a mail attribute information input mechanism that inputs an attribute of a mail to be transmitted. If the data processing apparatus has a mail attribute information input mechanism, the information control mechanism is operative when an attribute of a mail to be transmitted is input through the mail attribute information input mechanism to add the contents of the input attribute to the second specific field of the electronic mail.

Preferably, the predetermined facsimile transmission procedure is a Group 3 facsimile communications procedure.

Also, the first and second specific fields of the electronic mail are preferably From and Subject fields, respectively.

In another aspect, the present invention provides a method for facsimile which includes the steps of operatively connecting a data processing apparatus to a local area network, Internet, and a public telephone network, and providing the data processing apparatus with at least functions of transmitting and receiving electronic mail on the local area network and the Internet and transmitting and receiving image information in accordance with a predetermined facsimile transmission procedure through the public telephone network. The method further includes the steps of inputting transmitter unique information unique to a transmitter, a first step of placing the contents of transmitter unique information in a first specific field of the electronic mail when the contents of transmitter unique information input in the transmitter unique information inputting step is a mail address, a second step of placing the contents of transmitter unique information in a second specific field of the electronic mail when the contents of transmitter unique information input in the transmitter unique information inputting step is other than a mail address, and transmitting the image information using electronic mail when specified destination information defines a mail address.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a table showing a prior art example of a list of electronic mail information;

FIGS. 8A–8D are illustrations showing examples of header information generated by the Internet facsimile apparatus of FIG. 3;

FIG. 9 is a table showing a list of electronic mail information used by the Internet facsimile apparatus of FIG. 3;

FIG. 10 is a flowchart illustrating another example of the user transmission manipulation processing performed by the Internet facsimile apparatus of FIG. 3;

FIG. 12 is a table showing a list of electronic mail information based on the input information analysis processing and the header information creation processing of FIG. 11;

FIG. 13 is a table showing another example of the one-touch dial table; and

DETAILED DESCRIPTION OF THE PREFERRED EMBODIMENT

Figure 2:
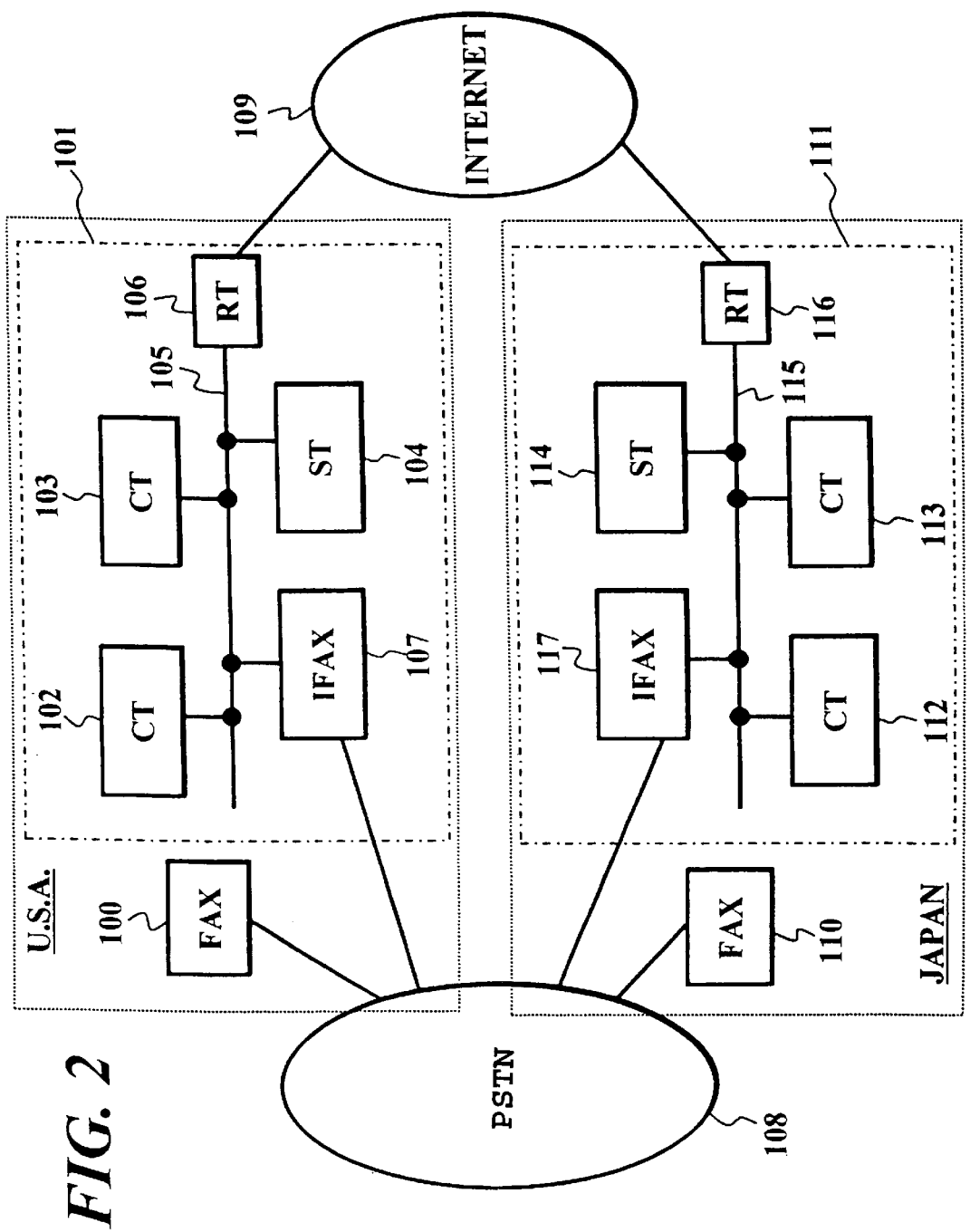
FIG. 2 is a block diagram illustrating a communications system including an Internet facsimile apparatus according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 2 thereof, there is illustrated a communications system which includes a schematic block diagram of an Internet facsimile apparatus according to an exemplary embodiment of the present invention.

The communications system of FIG. 2 includes a domain 101 centered on a local area network 105 installed in the United States, for example, and a domain 111 centered on a local area network 115 installed in Japan, for example. A facsimile apparatus (FAX) 100 is a Group-3 (G3) facsimile apparatus which performs a facsimile transmission operation using a Group 3 facsimile communications procedure. The facsimile apparatus 100 is installed in the United States and uses as a transmission path a public switched telephone network (PSTN) 108 which includes a plurality of telephone networks including national and international networks in the United States and those in Japan. A facsimile apparatus (FAX) 110 in turn is another G3 facsimile apparatus which is installed in Japan and also uses the PSTN 108 as a transmission path.

The respective domains 101, 111 are connected to their respective service providers (not shown) in the Internet 109 via dedicated lines through routers (RTs) 106, 116, respectively.

Each of the domains 101, 111 has a unique network address previously set thereto, with which the domains 101, 111 can mutually transmit data through the routers 106, 116 and the Internet 109. The unique network address is derived by dividing an assigned network address by a net mask of a predetermined value applied thereto.

The domain 101 is also provided with client terminals (CTs) 102 and 103 (referring to general workstations including personal computers or the like) connected to the local area network 105, and a mail server terminal (ST) 104 for providing an Internet facsimile apparatus (IFAX) 107 with an electronic mail service. Also, for example, each of the client terminals 102 and 103, the Internet facsimile apparatus 107 and the mail server terminal 104 has a unique host address previously set thereto which is formed by combining the network address of the domain 101 with a unique address thereof. A user using the domain 101 will have a user address set thereto which is formed by combining a unique user name with the host address of the client terminal 102 or 103.

Similarly, the domain 111 is provided with client terminals (CTs) 112 and 113 (referring to general workstations including personal computers or the like) connected to the local area network 115, and a mail server terminal (ST) 114 for providing an Internet facsimile apparatus (IFAX) 117 with an electronic mail service. Also, for example, each of the client terminals 112, 113, the Internet facsimile apparatus 117 and the mail server terminal 114 have a unique host address previously set thereto which is formed by combining the network address of the domain 111 with a unique address thereof. A user using the domain 111 will have a user address set thereto which is formed by combining a unique user name with the host address of the client terminal 112 or 113.

Each Internet facsimile apparatus 107, 117 has a transmission function for connecting to the local area network 105, 115 to communicate image information as electronic mail. Each also has a transmission function for connecting to the public switched telephone network 108 to transmit image information in accordance with a G3 facsimile transmission procedure using the public switched telephone network 108 as a transmission path.

Basically, communication of data between terminals connected to the local area networks 105, 115, and communication of data through the Internet 109 are performed in accordance with a combination of a transmission protocol up to a transport layer generally referred to as TCP/IP (Transmission Control Protocol/Internet Protocol) and a communications protocol for layers at higher levels (a so-called protocol suit). For example, for communication of data in the form of electronic mail, a communications protocol referred to as SMTP (Simple Mail Transfer Protocol) is applied to a communications protocol for layers at higher levels.

In this embodiment, electronic mail is transmitted as an accumulation delivery type transmission in which the electronic mail is accumulated in the associated mail servers 104, 114, and then delivered to respective destinations. In this event, if the value of a destination address (later described) added to an electronic mail includes the network address set for the associated domain 101 or 111, the electronic mail is accumulated as it is in the corresponding mail server terminal 104 or 114. If the value of a destination address added to an electronic mail includes a value other than the network address set for the associated domain 101 or 111, the electronic mail is sent to the Internet 109 through the router 106 or 116, and then transmitted to an appropriate domain, host or the like having a network address corresponding to the value of the destination address by a data transfer function provided by the Internet 109.

As a protocol used at each terminal to confirm with the associated mail server terminal 104 or 114 regarding the reception of electronic mail destined to the user, a so-called POP (Post Office Protocol) or the like is used.

Since electronic mail cannot directly contain binary data, a predetermined converting method (for example, Base 64 encoding method) is applied to convert binary data to readable information (7-bit character codes), and then the converted readable information is included in the electronic mail. The form of such an electronic mail is referred to as a MIME (Multipurpose Internet Mail Extensions; according to RFC 1521 and RFC1522) format, and the conversion processing for creating main text information in the MIME form is referred to as a MIME conversion.

Communication protocols such as TCP/IP, SMTP, POP and so on, a data format, data structure and so on of the electronic mail are defined by RFC (Request For Comments) documents which are published by the IETF (Internet Engineering Task Force) that collects technical contents related to the Internet. For example, TCP is defined by RFC793; IP by RFC793; SMTP by RFC821; and formats for electronic mail are defined by RFC822, RFC1521, RFC1522 (MIME format) and so on.

Figure 3:
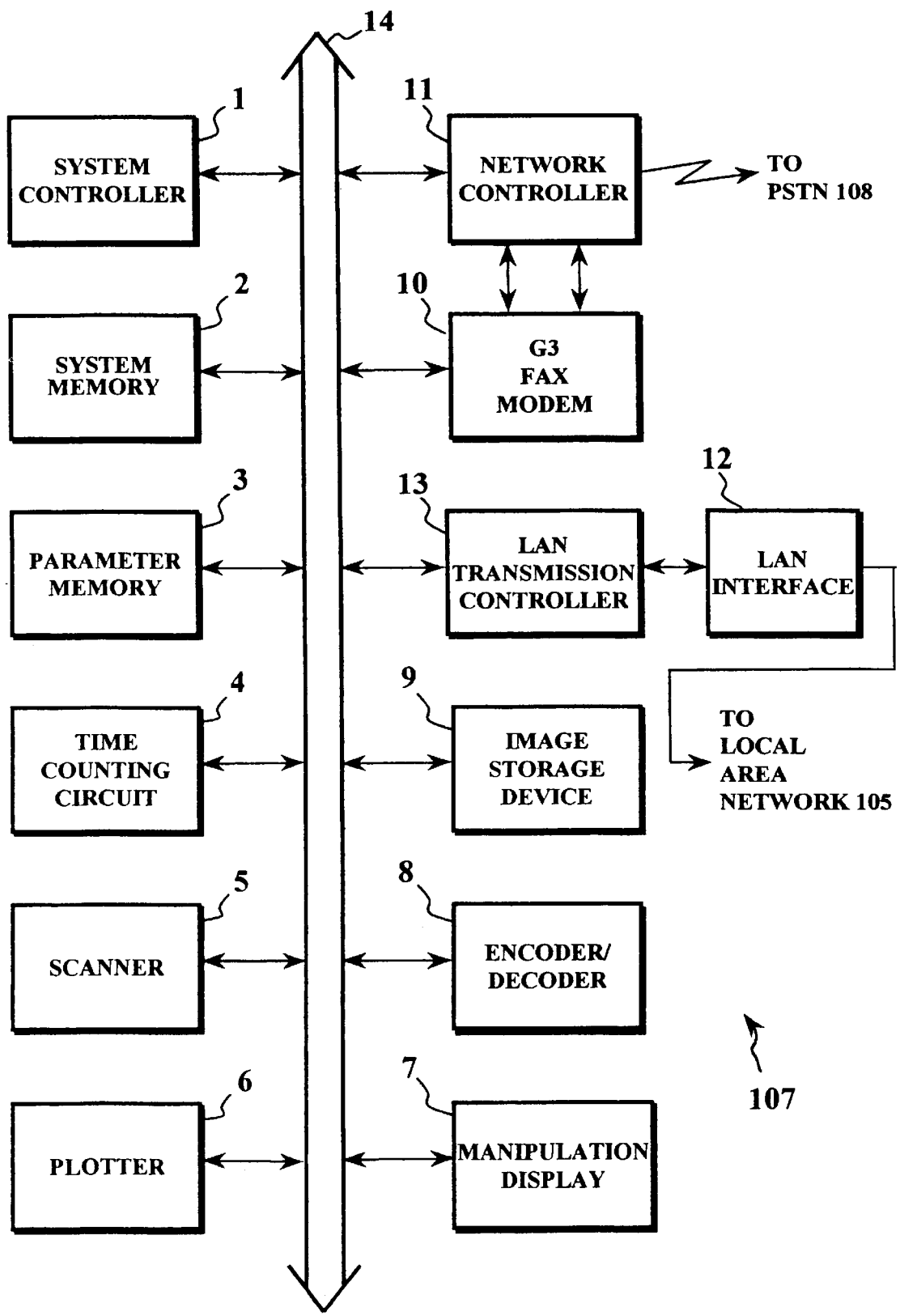
FIG. 3 is a block diagram illustrating an exemplary configuration of the Internet facsimile apparatus included in the communications system of FIG. 2.

Next, an exemplary configuration of the Internet facsimile apparatus 107 and 117 is explained with reference to FIG. 3. Since the configuration of the Internet facsimile apparatus 107 is similar to that of the Internet facsimile apparatus 117, the following description exemplarily describes only the Internet facsimile apparatus 107. In FIG. 3, a system controller 1 performs control processing for each section of the Internet facsimile apparatus 107, as well as a variety of control processing procedures such as a procedure for performing a facsimile transmission control procedure. A system memory 2 stores control processing programs executed by the system controller 1, and a variety of data required to execute the processing programs. System memory 2 also serves as a work area for the system controller 1. A parameter memory 3 stores a variety of information unique to the Internet facsimile apparatus 107, while a time counting circuit 4 outputs current time information.

A scanner 5 reads an original image at a predetermined resolution, while a plotter 6 records or outputs an image at a predetermined resolution. A manipulation display 7 is provided for the user to manipulate the Internet facsimile apparatus 107, and includes a variety of indicators and a variety of manipulation keys for inputting a variety of information including data and instructions.

An encoder/decoder 8 compresses/encodes an original image signal, and decodes/decompresses encoded image information back to its original form. An image storage unit 9 stores a number of compressed/encoded image information.

A G3 facsimile modem 10 is provided for implementing a modem function for the G3 facsimile, and has a low speed model function (V.21 modem) for communicating transmission procedure signals, and a high speed modem function (V17 modem, V.34 modem, V.29 modem, V.27ter modem and so on) mainly for communicating image information.

A network controller 11 connects the Internet facsimile apparatus 107 to the public switched telephone line network 108, and has an automatic transmission/reception function.

A local area network interface circuit 12 connects the Internet facsimile apparatus 107 to a local area network, while a local area network transmission controller 13 executes a communications control processing procedure for a predetermined protocol suite to communicate a variety of data with another data terminal through a local area network and the Internet.

The system controller 1, system memory 2, parameter memory 3, time counting circuit 4, scanner 5, plotter 6, manipulation display 7, encoder/decoder 8, image storage device 9, G3 facsimile modem 10, network controller 11 and local area network transmission controller 13 are interconnected through an internal bus 14, so that communications of data between these components are performed mainly through the internal bus 14. On the other hand, communications of data are directly performed between the network controller 11 and the G3 facsimile modem 10.

The thus-configured Internet facsimile apparatus 107 allows a user to directly manipulate the apparatus to transmit image information to the users of the client terminals 102, 103 and the client terminals 112, 113. Such an operation mode is referred to as a direct manipulation mode.

It should be noted however that manipulation keys provided on the manipulation display 7 of the Internet facsimile apparatus 107 suffers from a poor operability as compared with a keyboard attached to the client terminals 102, 103, 112, 113, for example, from a viewpoint of an available area and design unification.

To eliminate such poor operability, a one-touch dial key is provided to enable not only a telephone number of a destination but also a mail address of the destination user and the mail address of an originating user to be registered therein. The one-touch dial key herein refers to an input mechanism for use in a one-touch dial function which allows the user to specify or input a telephone number or the like only through manipulation of a single key (one-touch dial key).

Figures 4, 5:
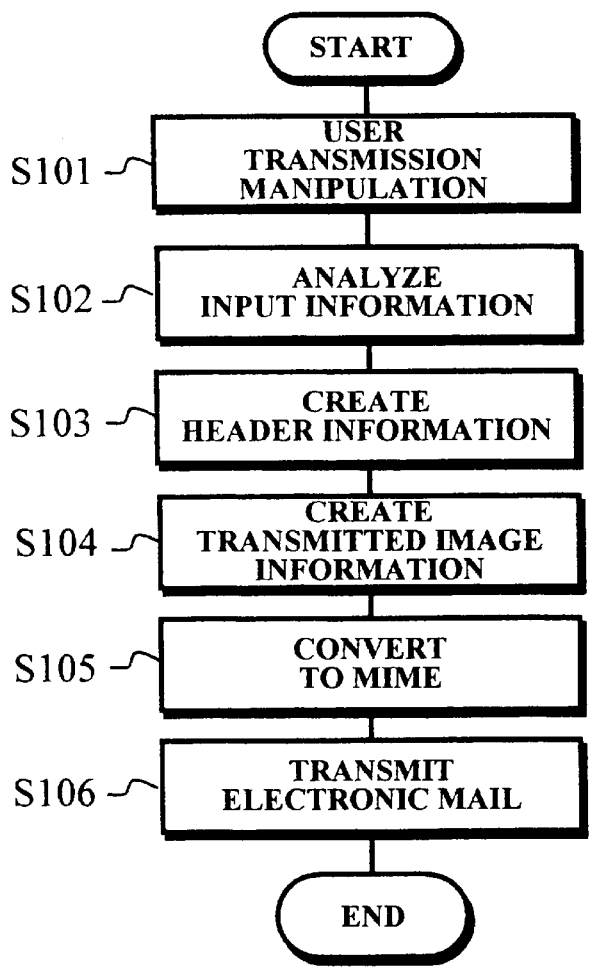
FIG. 4 is a table showing an example of a one-touch dial table used in the Internet facsimile apparatus of FIG. 3.
FIG. 5 is a flowchart generally illustrating the processing performed by the Internet facsimile apparatus of FIG. 3 in a direct manipulation mode.

For this purpose, a one-touch dial table, for example, as shown in FIG. 4 is stored in the Internet facsimile apparatus 107. Preferably, such a one-touch dial table is stored in the system memory 2, for example.

Each record in the one-touch dial table includes an item number for identifying each one-touch dial, a registered number for registering a telephone number or a mail address, and a registered name for registering a name associated with the registered number. In this case, a mail address registered as a registered number and an originating user name registered as a registered name may be used as transmitter unique information.

Next, an exemplary procedure of an operation in the direct manipulation mode of the Internet facsimile apparatus 107 is explained with reference to FIG. 5. First, the user performs a transmission manipulation (user transmission manipulation: Step S101). In the user transmission manipulation, the user sets an original to be transmitted in the scanner 5, inputs a mail address of a destination user, his own mail address and so on, and depresses a start key to instruct the Internet facsimile apparatus 107 to start a transmission operation.

Then, the contents input through the manipulation in the user transmission manipulation processing (Step S101) are analyzed (Step S102), and header information is created for an electronic mail in accordance with the result of analysis on the input information (Step S103). Then, the original to be transmitted is read by the scanner, and the resulting image data is compressed/encoded by the encoder/decoder 8 to create transmitted image information (Step S104). The transmitted image information is converted to the MIME format (Step S105) to create main text information for the electronic mail. Finally, the electronic mail including the header information created at Step S103 and the main text information created at Step S105 is transmitted to the associated mail server (Step S106).

Figure 6:
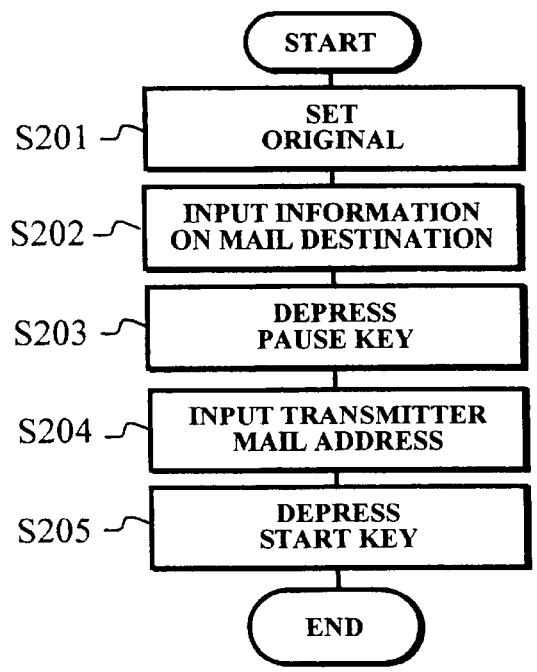
FIG. 6 is a flowchart illustrating an example of user transmission manipulation processing performed by the Internet facsimile apparatus of FIG. 3.

Next, an exemplary procedure of the user transmission manipulation operation performed in Step S101 is explained in more detail with reference to FIG. 6. The originating user first sets an original to be transmitted in the scanner 5 (Step S201). Then, the user inputs information on the destination using the one-touch key (Step S202). In this event, the destination information such as the mail address of the destination user may be input using keys on the direct manipulation display 7.

Then, the originating user depresses a pause key (not shown) arranged on the manipulation display 7 (Step S203), and inputs transmitter unique information such as the mail address given to himself and so on using the one-touch key or keys on the manipulation display 7 (Step S204). The transmitter unique information may be the name of department or section to which the user belongs, his own name, or the like, other than the mail address. In some cases, the originating user may omit the entry of the transmitter unique information at Step S204. Finally, the user depresses a start key (not shown) arranged on the manipulation display 7 (Step S205), thus terminating the user transmission manipulation processing.

Figure 7:
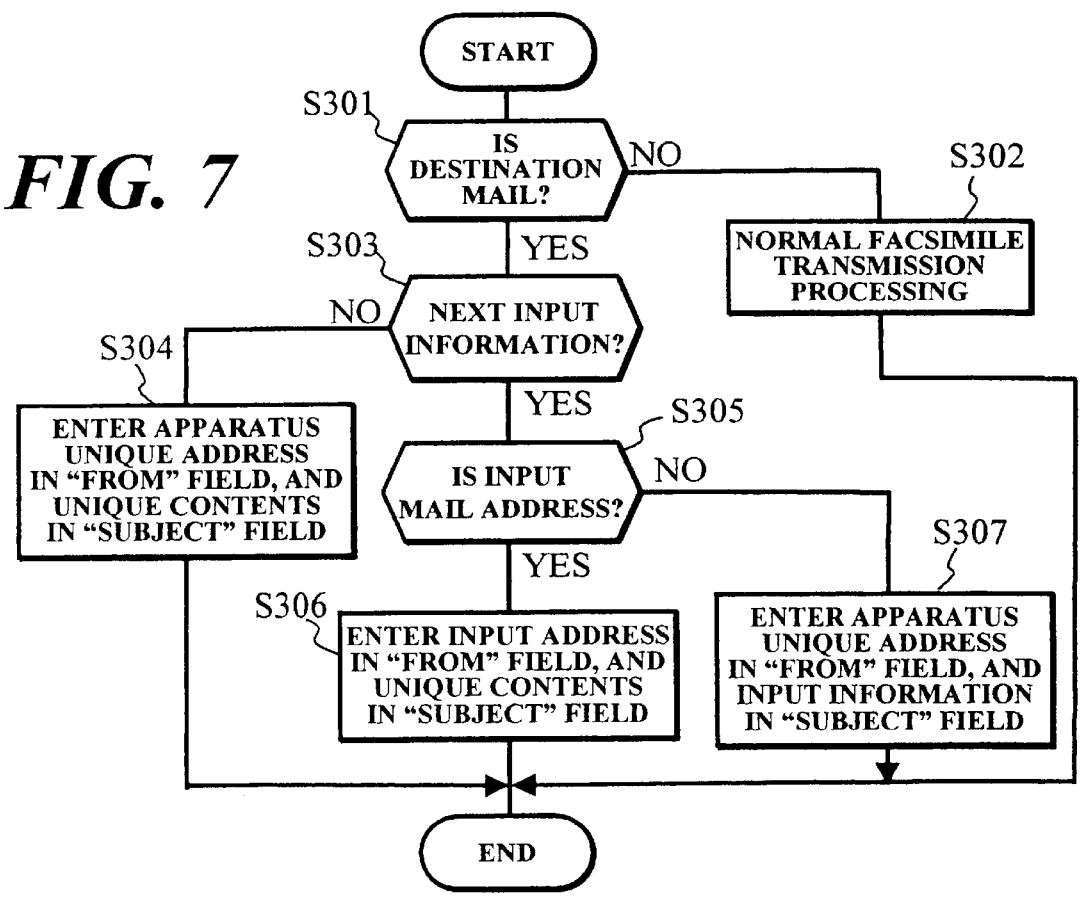
FIG. 7 is a flowchart illustrating an example of input information analysis processing and header information creation processing performed by the Internet facsimile apparatus of FIG. 3.

Next, an exemplary procedure of an exemplary combined operation of the input information analysis operation performed in Step S102 and the header information creation operation performed in Step S103 is explained in more detail by reference to FIG. 7. It is first examined whether a transmission destination is a mail address (Step S301). A normal facsimile transmission processing (step S302) is executed if the result at Step S301 is NO.

Conversely, if the result at Step S301 is YES, it is determined whether next input information is present (Step S303). If the result at Step S303 is NO, an apparatus unique address set to the Internet facsimile apparatus 107 (in this case, "inet-fax@abcd.co.jp") is entered in the From field of the header information, and unique contents set to the Internet facsimile apparatus 107 (in this case, "FAX Message from Internet FAX") are entered in the Subject field of the header information (Step 304), for example as shown in FIG. 8A, followed by the termination of this processing.

Conversely, if the result at Step S303 is YES, it is determined whether the contents of the input information is a mail address (Step S305). If the result at Step S305 is YES, the input mail address (in this case, "user1@abcd.co.jp") is entered in the From field of the header information, and unique contents set to the Internet facsimile apparatus 107 (in this case, "FAX Message from Internet FAX") are entered in the Subject field (Step S306), for example as shown in FIG. 8B, followed by the termination of this processing.

Conversely, if the result at Step S305 is NO, the apparatus unique address set to the Internet facsimile apparatus 107 (in this case, "inet-fax@abcd.co.jp") is entered in the From field of the header information, and the contents of input transmitter unique information (in this case, "FAX Message from [Originating User Name 1]") is entered in the Subject field (Step S307), for example as shown in FIG. 8C, followed by the termination of this processing. This is the case where [Originating User Name 1] has been input as the transmitter unique information.

Thus, the user who has received electronic mail from the Internet facsimile apparatus 107 can be provided with information regarding the electronic mail in the form of a list, for example, as shown in FIG. 9, which permits the user to estimate the contents of the respective electronic mails from the displayed contents of subject names (the contents of the Subject fields in the received electronic mails) or from the displayed contents of transmitter names (the contents of the From fields in the received electronic mails), and readily find a desired electronic mail.

Next, another exemplary procedure of the operation of the user transmission manipulation performed in Step S101 is explained with reference to FIG. 10. First, the originating user sets an original to be transmitted on the scanner 5 (Step S401). Then, the user inputs destination information regarding a transmission destination using the one-touch key (Step S402). In this event, the destination information such as a mail address of a destination user may be directly input using keys on the manipulation display 7.

Then, the originating user depresses the pause key (not shown) arranged on the manipulation display 7 (Step S403), and inputs the transmitter unique information such as the mail address given to himself using the one-touch key or keys on the manipulation display 7 (Step S404). The transmitter unique information may be the name of a department or a section to which the user belongs, his own name, or the like, other than the mail address. In some cases, the originating user may omit inputting the transmitter unique information at Step S404.

Then, the user again depresses the pause key (Step S405), and inputs the contents of an attribute of a mail to be transmitted, for example, "urgent," "important" or the like (Step S406). Such attribute may be input only through selection of a one-touch key if several attributes have been previously registered in one-touch keys. Alternatively, the manipulation display 7 may be provided with special keys for inputting an attribute such that the user may manipulate the attribute keys to input an attribute. In some cases, the originating user may omit inputting the attribute.

Finally, the user depresses the start key (not shown) arranged on the manipulation display 7 (Step S407), followed by termination of the user transmission manipulation operation.

Figure 11:
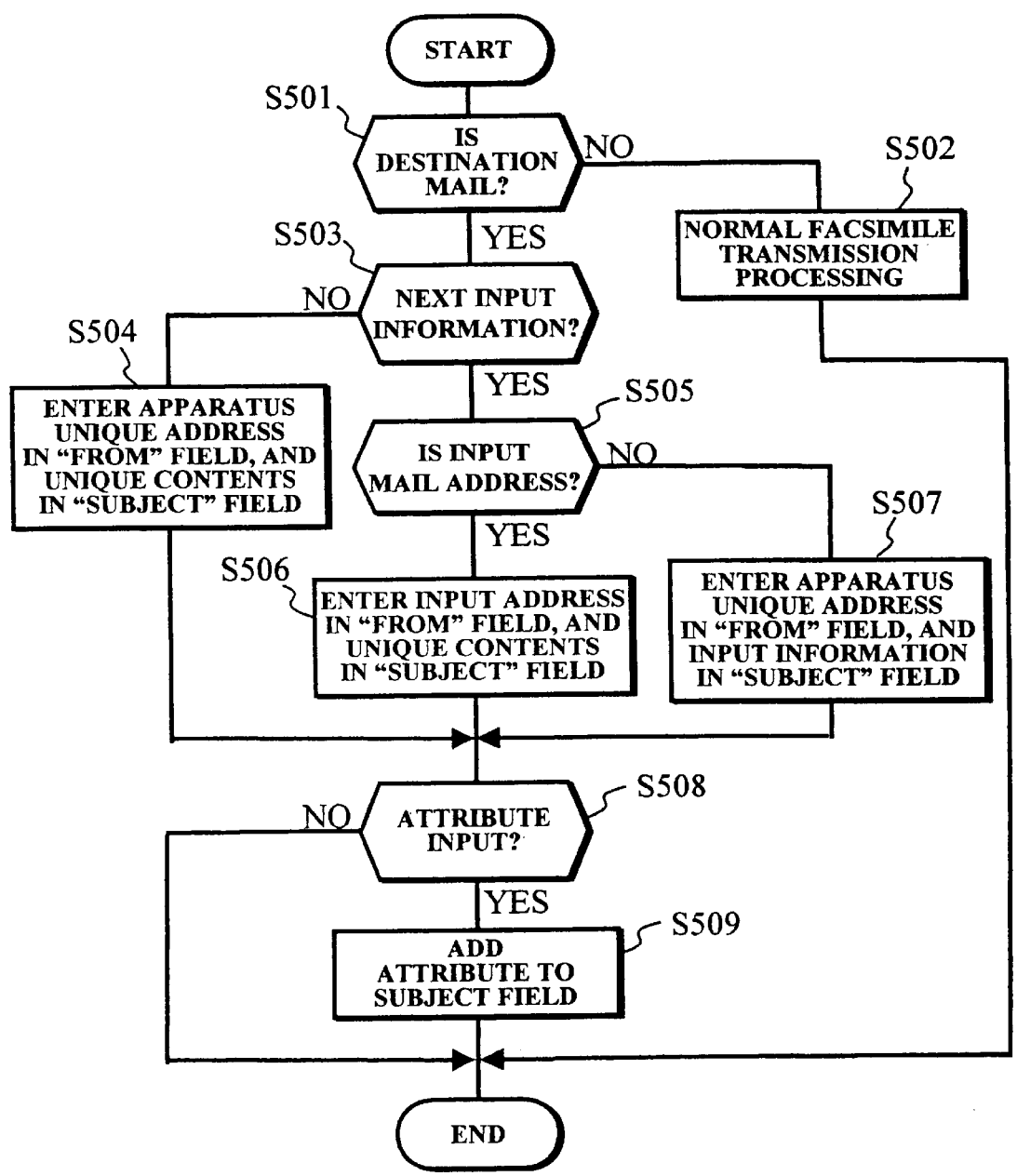
FIG. 11 is a flowchart illustrating another example of the input information analysis processing and the header information creation processing performed by the Internet facsimile apparatus of FIG. 3.

Next, another exemplary procedure of an exemplary combined operation of the input information analysis operation performed in Step S102 and the header information creation operation performed in Step S103 is explained with reference to FIG. 11. First, it is determined whether a transmission destination is a mail address (Step S501). If the result at Step S501 is NO, normal facsimile transmission processing is executed (Step S502).

Conversely, if the result at Step S501 is YES, it is determined whether next input information is present (Step S503). If the result at Step S503 is NO, the apparatus unique address set to the Internet facsimile apparatus 107 (in this case, "inet-fax@abcd.co.jp") is entered in the From field of the header information, and unique contents set to the Internet facsimile apparatus 107 (in this case, "FAX Message from Internet FAX") is entered in the Subject field (Step S504), for example, as shown in FIG. 8A.

Conversely, if the result at Step S503 is YES, it is examined whether or not the contents of input information is a mail address (Step S505). If the result at Step S505 is YES, the input mail address (in this case, "user1@abcd.co.jp") is entered in the From field of the header information, and the unique contents set to the Internet facsimile apparatus 107 (in this case, "FAX Message from Internet FAX") are entered in the Subject field (Step S506), for example, as shown in FIG. 8B.

Conversely, if the result at Step S505 is NO, the apparatus unique address set to the Internet facsimile apparatus 107 (in this case, "inet-fax@abcd.co.jp") is entered in the From field of the header information, and the contents of the input transmitter unique information (in this case, "FAX Message from [Originating User Name 1]) is entered in the Subject field (Step S507), for example, as shown in FIG. 8C.

When the From field and the Subject field have been fully entered in the manner described above, it is next determined whether any attribute has been entered (Step S508). If the result at Step S508 is YES, the contents of the Subject field are replaced with the previously entered contents plus the contents of an attribute additionally entered at that time (Step S509), for example, as shown in FIG. 8D, followed by the termination of this operation. In the example shown in FIG. 8D, "<Urgent>" is added as the contents of an attribute.

Conversely, if the result at Step S508 is NO, the processing is terminated without any further actions. In this case, therefore, the user who has received electronic mail from the Internet facsimile apparatus 107 can be provided with information regarding the electronic mail in the form of list, for example, as illustrated in FIG. 12, which permits the user to estimate the contents of the respective electronic mails from the displayed contents of subject names or transmitter names, and readily find a desired electronic mail.

In addition, since the attributes of the mail are simultaneously displayed in the list, the user can also know the importance, urgency and so on of electronic mail, thereby facilitating a search for a particular electronic mail and significantly improving the usability of the Internet facsimile apparatus.

As an alternative structure for the one-touch dial table, when mail addresses of a destination user and an originating user are registered in pairs as shown in FIG. 13, an originating user can conveniently input a mail address of a destination user and the mail address of his own (source mail address) only through manipulation on a single one-touch dial key.

In this case, a mail address of a registered number registered in an input on-touch dial key may be used as a destination mail address, while a source mail address may be used as a mail address input as transmitter unique information in the input information analysis and header information creation operations performed in Steps S102 and S103 of FIG. 5, respectively.

Figure 14:
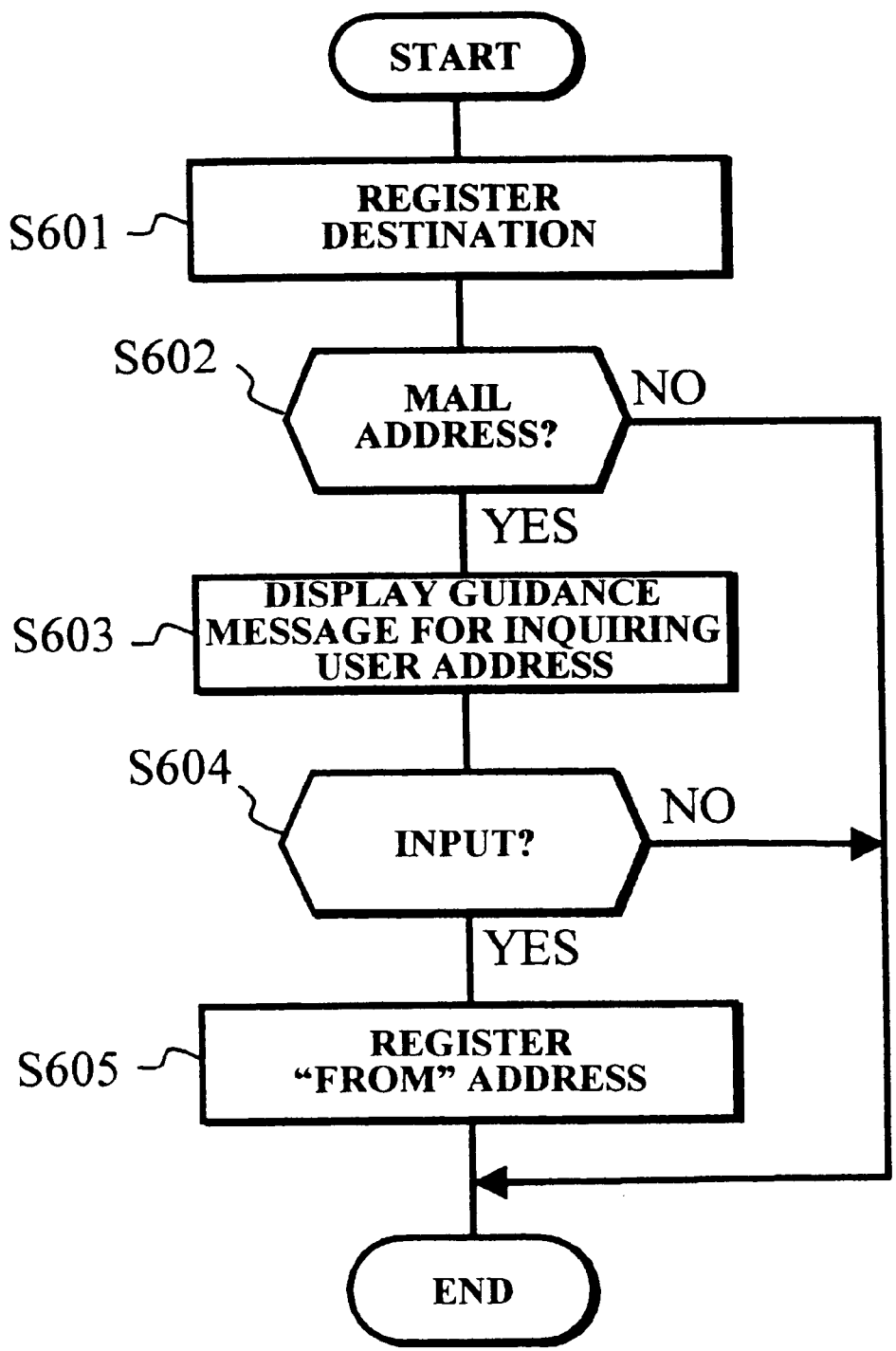
FIG. 14 is a flowchart illustrating exemplary processing for registering one-touch dial information in the Internet facsimile apparatus of FIG. 3.

Next, an exemplary procedure of an operation for registering one-touch dial information in this case is explained with reference to FIG. 14. First, as destination number information has been registered (Step S601), it is examined whether or not the registered contents is a mail address (Step S602). If the result at Step S602 is YES, a guidance message for inquiring whether the user inputs his own address, for example, "Do you input your address? (YES/NO)" is displayed (Step S603).

If the user responds with "YES" to the guidance message (the result at Step S604 is YES), the From address, i.e., the source mail address is registered (Step S605).

Conversely, if the user responds with "NO" to the guidance message (the result at Step S604 is NO), this operation is terminated without registering the transmitter mail address.

In this way, the user can register a one-touch dial key with a destination mail address and his own mail address (source mail address).

While in the foregoing embodiment, the originating user name is used as the transmitter unique information to be registered in the one-touch dial table, other transmitter unique information than that may also be registered. For example, the name of a company or a department, or a nickname may be registered instead.

Also, while in the foregoing embodiment one piece of information is entered as the transmitter unique information, two or more pieces of transmitter unique information may be entered, in which case, a mail address may be placed in the From field, and other information in the Subject field.

Further, while the foregoing embodiments describe a PSTN as the public network connected to the Internet facsimile apparatus, the present invention is also applicable in a similar manner when ISDN or other type of network is applied as a public network.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present invention are possible in light of the above teachings. It is therefore to be understood that within the scope of the appended claims, the present invention may be practiced otherwise than as specifically described herein.

This document is based on Japanese Patent Application No. JPAP10-123939 filed in the Japanese Patent Office on Apr. 20, 1998, the entire contents of which are hereby incorporated by reference.

What is claimed is:

1. A data processing apparatus, operatively connected to a local area network, Internet, and a public telephone network and having at least functions of transmitting and receiving electronic mail on the local area network and the Internet and transmitting and receiving image information in accordance with a predetermined facsimile transmission procedure through the public telephone network, said data processing apparatus comprising:

a transmitter unique information input mechanism which allows a user transmitting an electronic mail to input transmitter unique information uniquely associated with said user transmitter;

a transmission controller, operative when specified destination information is a mail address upon transmitting image information, to transmit said image information using electronic mail; and an information controller, operative when the contents of transmitter unique information input through said transmitter unique information input mechanism is a mail address, to place the contents of the input transmitter unique information in a first specific field of said electronic mail, and operative, when the contents of the transmitter unique information input through said transmitter unique information input mechanism is other than a mail address, to place the contents of the transmitter unique information in a second specific field of said electronic mail.

2. The data processing apparatus as defined in claim 1, further comprising a mail attribute information input mechanism which inputs an attribute of mail to be transmitted, and wherein said information controller is operative when an attribute of a mail to be transmitted is input through said mail attribute information input mechanism to add the contents of the input attribute to the second specific field of said electronic mail.

3. The data processing apparatus as defined in claim 1, wherein said predetermined facsimile transmission procedure is a Group 3 facsimile communications procedure.

4. The data processing apparatus as defined in claim 1, wherein said first and second specific fields of said electronic mail are From and Subject fields, respectively.

5. A data processing apparatus, operatively connected to a local area network, Internet, and a public telephone network and having at least functions of transmitting and receiving electronic mail on the local area network and the Internet and transmitting and receiving image information in accordance with a predetermined facsimile transmission procedure through the public telephone network, said data processing apparatus comprising: transmitter;

transmission control means, operative when specified destination information is a mail address upon transmitting image information, to transmit said image information using electronic mail; and information control means, operative when the contents of transmitter unique information input through said transmitter unique information input means is a mail address, to place the contents of the input transmitter unique information in a first specific field of said electronic mail, and operatively, when the contents of the transmitter unique information input through said transmitter unique information input means is other than a mail address, to place the contents of the transmitter unique information in a second specific field of said electronic mail.

6. The data processing apparatus as defined in claim 5, further comprising a mail attribute information input mechanism which inputs an attribute of a mail to be transmitted, and wherein said information controller is operative when an attribute of a mail to be transmitted is input through said mail attribute information input mechanism to add the contents of the input attribute to said second specific field of said electronic mail.

7. The data processing apparatus as defined in claim 5, wherein said predetermined facsimile transmission procedure is a Group 3 facsimile communications procedure.

8. The data processing apparatus as defined in claim 5, wherein said first and second specific fields of said electronic mail are From and Subject fields, respectively.

9. A data processing apparatus, operatively connected to a local area network, Internet, and a public telephone network and having at least functions of transmitting and receiving electronic mail on the local area network and the Internet and transmitting and receiving image information in accordance with a predetermined facsimile transmission procedure through the public telephone network, said data processing apparatus comprising:

transmitter unique information input means for inputting transmitter unique information unique to a transmitter;

transmission control means, operative when specified destination information is a mail address upon transmitting image information, to transmit said image information using electronic mail; and information control means, operative when the contents of transmitter unique information input through said transmitter unique information input means is a mail address, to place the contents of the input transmitter unique information in a first specific field of said electronic mail, and operative, when the contents of the transmitter unique information input through said transmitter unique information input means is other than a mail address, to place the contents of the transmitter unique information in a second specific field of said electronic mail.

10. The data processing apparatus as defined in claim 9, further comprising mail attribute information input means for inputting an attribute of a mail to be transmitted, and wherein said information control means is operative when an attribute of a mail to be transmitted is input through said mail attribute information input means to add the contents of the input attribute to the second specific field of said electronic mail.

11. The data processing apparatus as defined in claim 9, wherein said predetermined facsimile transmission procedure is a Group 3 facsimile communications procedure.

12. The data processing apparatus as defined in claim 9, wherein said first and second specific fields of said electronic mail are From and Subject fields, respectively.

13. A data processing apparatus, operatively connected to a local area network, Internet, and a public telephone network and having at least functions of transmitting and receiving electronic mail on the local area network and the Internet and transmitting and receiving image information in accordance with a predetermined facsimile transmission procedure through the public telephone network, said data processing apparatus comprising:

dial shortening means for specifying destination information with less key manipulations, said dial shortening means being additionally registered with transmitter unique information uniquely associated with a user transmitter and associated with destination information when the destination information is a mail address;

transmission control means, operative when destination information specified by said dial shortening means is a mail address upon transmitting image information, to transmit the image information using electronic mail; and information control means, which reads transmitter unique information associated with destination information registered in said dial shortening means, said information control means being operative when the contents of the read transmitter unique information is a mail address to place the contents of the read transmitter unique information in a first specific field of said electronic mail, and operative when the contents of the read transmitter unique information is other than a mail address to place the contents of the read transmitter unique information in a second specific field of said electronic mail.

14. The data processing apparatus as defined in claim 13, further comprising mail attribute information input means for inputting an attribute of a mail to be transmitted, and wherein said information control means is operative when an attribute of a mail to be transmitted is input through said mail attribute information input means to add the contents of the input attribute to said second specific field of said electronic mail.

15. The data processing apparatus as defined in claim 13, wherein said predetermined facsimile transmission procedure is a Group 3 facsimile communications procedure.

16. The data processing apparatus as defined in claim 13, wherein said first and second specific fields of said electronic mail are From and Subject fields, respectively.

17. A method for facsimile, comprising:

operatively connecting a data processing apparatus to a local area network, Internet, and a public telephone network;

providing said data processing apparatus with at least functions of transmitting and receiving electronic mail on the local area network and the Internet and transmitting and receiving image information in accordance with a predetermined facsimile transmission procedure through said public telephone network;

allowing a user transmitting an electronic mail to input transmitter unique information uniquely associated with said user transmitter;

a first step of placing the contents of transmitter unique information in a first specific field of said electronic mail when the contents of transmitter unique information input in said transmitter unique information inputting step is a mail address;

a second step of placing the contents of transmitter unique information in a second specific field of said electronic mail when the contents of transmitter unique information input in said transmitter unique information inputting step is other than a mail address; and transmitting said image information using electronic mail when specified destination information defines a mail address.

18. The data processing apparatus as defined in claim 17, further comprising the steps of inputting an attribute of a mail to be transmitted and adding the contents of the input attribute to the second specific field of said electronic mail when an attribute of a mail to be transmitted is input in said mail attribute inputting step.

19. The data processing apparatus as defined in claim 17, wherein said predetermined facsimile transmission procedure is a Group 3 facsimile communications procedure.

20. The data processing apparatus as defined in claim 17, wherein said first and second specific fields of said electronic mail are From and Subject fields, respectively.

21. A data processing apparatus, comprising the steps of:

operatively connecting a data processing apparatus to a local area network, Internet, and a public telephone network;

providing said data processing apparatus with at least functions of transmitting and receiving electronic mail on the local area network and the Internet and transmitting and receiving image information in accordance with a predetermined facsimile transmission procedure through the public telephone network;

providing said data processing apparatus with a dial shortening mechanism for specifying destination information with less key manipulations, said dial shortening means being additionally registered with transmitter unique information uniquely associated with a user transmitter and associated with destination information when the destination information is a mail address;

specifying destination information through said dial shortening mechanism;

reading transmitter unique information associated with said destination information and registered in said dial shortening means;

placing the contents of transmitter unique information in a first specific field of said electronic mail when the contents of the transmitter unique information read in said reading step is a mail address;

placing the contents of transmitter unique information in a second specific field of said electronic mail when the contents of the transmitter unique information read in said reading step is other than a mail address; and transmitting the image information using electronic mail when destination information specified in said specifying step is a mail address.

22. The method as defined in claim 21, further comprising steps of inputting an attribute of a mail to be transmitted, and adding the contents of the input attribute to said second specific field of said electronic mail when an attribute of a mail to be transmitted is input through said mail attribute.

23. The method as defined in claim 21, wherein said predetermined facsimile transmission procedure is a Group 3 facsimile communications procedure.

24. The method as defined in claim 21, wherein said first and second specific fields of said electronic mail are From and Subject fields, respectively.

25. A communications system, comprising:

a plurality of data processing apparatuses, each operatively connected to a local area network, Internet, and a public telephone network and having at least functions of transmitting and receiving electronic mail on the local area network and the Internet and transmitting and receiving image information in accordance with a predetermined facsimile transmission procedure through the public telephone network, wherein each of said data processing apparatuses comprising:

a transmitter unique information input mechanism which allows a user transmitting an electronic mail to input transmitter unique information uniquely associated with said user transmitter;

a transmission controller operative when specified destination information is a mail address upon transmitting image information to transmit said image information using electronic mail; and an information controller operative when the contents of transmitter unique information the contents of the input transmitter unique information in a first specific field of said electronic mail, and operative, when the contents of the transmitter unique information input through said transmitter unique information input mechanism is other than a mail address, to place the contents of the transmitter unique information in a second specific field of said electronic mail.

* * * * *